Patented Jan. 14, 1947

2,414,428

UNITED STATES PATENT OFFICE 2,414,428

PROCESS FOR RECLAIMING WASTE POLYCHLOROPRENE

Walter G. Kirby and Leo E. Steinle, Naugatuck, Conn., assignors to United States Rubber Company, New York, N. Y., a corporation of New Jersey No Drawing. Application July 27, 1944, Serial No. 546,929

3 Claims. (Cl. 260—23)

This invention relates to a process for reclaiming scrap containing elastic polymerized chloro-2-butadiene-1,3 in its various forms, hereinafter referred to for convenience as polychloroprene, and more particularly to reclaiming such scrap in the "digester" or "heater" as used in the conventional reclaiming of vulcanized natural rubber scrap.

Plastic polymerized chloroprene in various forms and containing certain modifying and stabilizing agents is sold under the name of neoprene in a number of types, such as E, M, G, GN, I, etc. Neoprene GN, an outstanding material, is understood to be prepared by polymerization of chloroprene in the presence of sulphur. Neoprene I is understood to be prepared by polymerization of chloroprene and a portion of an unsaturated nitrile in the presence of sulphur. When these various types of neoprene are mixed with selected modifying agents, softeners, fillers, reinforcing agents, etc., in the manner generally known to the art, and said mixtures are subjected to a heating process, the neoprene mixture is converted from a plastic to a tough elastic material by a process generally called curing or vulcanizing. The tough elastic body is referred to as vulcanized neoprene. The vulcanization step may occur at low or high temperatures and may proceed to various degrees. If it takes place at or near room temperature or during processing, it is referred to as "scorching." The neoprene mixtures in which "scorching" has proceeded to even a relatively slight degree cannot be satisfactorily milled, tubed, calendered, or otherwise processed in the industry and so must be scrapped. For convenience "scorched" and fully vulcanized elastic neoprene mixtures or products made from such mixtures will be referred to herein as vulcanized neoprene.

The art of reclaiming vulcanized natural rubber scrap is well known. In the usual "digester" process, a charge of ground rubber and water, or a solution of a cellulose-destroying chemical, such as caustic soda or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried or somewhat moistened condition is heated with steam under pressure in trays or pans in an autoclave until the rubber becomes plasticized. The plasticized scrap is then removed from the "heater" and milled. The elevated temperatures in these reclaiming operations which range from approximately 300° F. to approximately 420° F. are desirable because they accelerate the reversion of vulcanization of the rubber, and speed up the action of oils and softening agents that are usually added as reclaiming aids. These higher temperatures are also desirable to accelerate and promote the rapid destruction of fiber when it is present.

Neoprene is different from natural rubber in that it does not combine with sulphur to bring about vulcanization and does not undergo reversion of vulcanization through the medium of heat, to change it from an elastic to a plastic form. On the contrary when heat and especially the higher temperatures referred to are applied to vulcanized neoprene it becomes harder and is said to be further vulcanized. Therefore, one of the great difficulties in attempting to reclaim scrap vulcanized neoprene is the fact that as the temperature is raised during the process to accelerate the action of oils and softening agents in plasticizing or otherwise breaking down the polymer to a plastic state, there occurs during the same period a gradual further polymerizing and hardening of the neoprene, due to these temperatures, which counteracts any plasticizing effect accomplished. Scrap vulcanized fiber-free polychloroprene cannot be reclaimed in the conventional "digester" or "heater" under the conditions of time and temperature and with the reclaiming agents usually associated with the reclaiming of vulcanized natural rubber scrap. Fiber-containing vulcanized polychloroprene scrap may be reclaimed in the "digester."

By the present invention scrap containing vulcanized polychloroprene, or blends of vulcanized polychloroprene with vulcanized natural rubber, may be readily reclaimed, as in the conventional "digester" or "heater" processes. Fiber-free scrap containing vulcanized polychloroprene may be reclaimed under conditions of time and temperature approximating those usually employed in the reclaiming of vulcanized natural rubber scrap. Also the necessary time for reclaiming fiber-containing scrap including vulcanized polychloroprene in the "digester" is greatly reduced.

According to the present invention lecithin is added to the scrap containing vulcanized polychloroprene as a reclaiming agent before the reclaiming operation, as in the conventional "digester" or "heater" process. The amount of lecithin is not critical. In the case of natural rubber scrap containing only a small amount of vulcanized polychloroprene, small amounts of lecithin, for example one-half to 5% by weight of the scrap, will give adequate reclaiming. Larger amounts of lecithin up to 10% or more by weight of the scrap may be used as the reclaiming aid. The reclaiming in the "digester" or "heater" process may take place at the usual temperatures of about 300° F. to about 420° F. The heating time varies depending on the type of scrap, temperature, amount of lecithin and other conventional softening oils, and preferably ranges from 3 to 30 hours.

The effectiveness of a reclaiming operation in recovering scrap vulcanized rubber or synthetic rubber-like material, such as polychloroprene, may be quantitatively shown by means of an instrument widely used for this purpose in the reclaim rubber industry, namely, the Mooney shearing disc plastometer. This device has been described by M. Mooney in Industrial and Engineering Chemistry, An. Ed. 6, 147 (1934). By means of this device the viscosity of a plastic material in shear may be readily and quantitatively measured. Experience has shown that materials with a Mooney viscosity of 80 to 180 when tested at 180° F. can be readily and efficiently processed on standard rubber working machinery, but that materials of a very high viscosity such as 200 and over when tested at 180° F. cannot be so treated.

The following is illustrative of the invention:

Fiber-free vulcanized neoprene scrap was ground to a desired particle size of about 6 mesh. Different portions of the comminuted scrap were then mixed with reagents according to each of the following formulations, formulation B including commercial soy bean lecithin, and formulation A not including the same:

|  | Parts by weight | |
|---|---|---|
|  | A | B |
| Ground vulcanized fiber-free neoprene scrap | 100 | 100 |
| Pine oil fraction | 15 | 15 |
| Rosin oil | 10 | 10 |
| Lecithin |  | 5 |
| Water | 2 | 2 |

Charges A and B were each treated in a "heater" at 388° F. for five hours. After these treatments, the products were removed from the heaters, dried, and subjected to the usual milling process. After milling product B had a Mooney viscosity at 180° F. of 101, whereas product A remained in a non-plastic condition approaching that before treatment and was too hard to be further milled or tested.

The same comparative results as above are obtained in reclaiming in a "digester" instead of a "heater." In the "digester" large amounts of water are added, for example 200 parts of water per 100 parts of scrap, and the mixing is provided by an internal agitator in the "digester" during the reclaiming operation as in conventional practice. In the case of scrap containing fiber, it is preferred to add a small amount of calcium chloride, for example, 2 parts per 100 parts of scrap to aid the elevated temperature in the destruction of the fibers.

Although for purposes of comparison, the lecithin reclaiming agent of the present invention is used in the above illustration with 15 parts of pin oil fraction and 10 parts of rosin oil to 100 parts of the scrap vulcanized neoprene, it is to be understood that the invention is in no way limited to the lecithin reclaiming agent with these oils or proportions thereof. We can use our lecithin reclaiming agents both with and without oils, and the proportions and nature of the oils, swelling and binding agents, pectins, etc., used with the lecithin reclaiming aids may be varied at will to suit the purposes for which the final reclaimed product is intended. The lecithin reclaiming aids can further be used with vulcanized neoprene containing all the modifying agents and compounding agents used in the trade in the production of vulcanized neoprene products, for example, magnesia, zinc oxide, other metallic oxides, antioxidants, sulphur, accelerators, retarders, softeners, fillers, reinforcing materials, and other ingredients which effect the plasticity, rate of cure, and/or physical properties of the vulcanizate.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process of reclaiming scrap containing vulcanized polychloroprene which comprises heating the same while in a comminuted condition at a temperature from about 300° F. to about 420° F. in the presence of water and lecithin for a time sufficient to reduce the scrap to a plastic state where it has a Mooney viscosity of substantially less than 200 when tested at 180° F.

2. A process of reclaiming scrap containing vulcanized polychloroprene which comprises heating the same while in a comminuted condition in the presence of water and lecithin for about 3 to about 30 hours at a temperature from about 300° F. to about 420° F.

3. A process of reclaiming scrap containing vulcanized polychloroprene which comprises heating the same while in a comminuted condition in the presence of water and lecithin for about 3 to about 30 hours at a temperature from about 300° F. to about 420° F., thereby to reduce the scrap to a plastic state where it has a Mooney viscosity of substantially less than 200 when tested at 180° F.

WALTER G. KIRBY.
LEO E. STEINLE.